3,465,014
METAL CHELATES HAVING A PHOSPHATE ESTER GROUP CONTAINING A PERFLUOROALIPHATIC RADICAL

Frank J. Pavlik, St. Paul, Minn., assignor to Minnesota Mining and Manufacturing Company, St. Paul, Minn., a corporation of Delaware
No Drawing. Filed Aug. 21, 1967, Ser. No. 661,836
Int. Cl. C07f 5/06; C23c 7/00
U.S. Cl. 260—448                                 7 Claims

ABSTRACT OF THE DISCLOSURE

This invention relates to a new class of phosphorus and fluorine containing compounds especially useful for coating metal and other surfaces, in particular to a new class of metal chelates having a phosphate ester group containing a perfluoroaliphatic radical, the phosphorus of said phosphate ester being bonded to a polyvalent metal atom chelated to a beta-dicarbonyl compound.

---

This invention relates to a phosphorus containing polyvalent metal complexes, their preparation and use.

In many sophisticated precision instruments the extreme tolerances which must be maintained between moving parts have resulted in the development and use of special lubricants. These close tolerances permit only a very small amount of lubricant on the working surfaces. An extended period of continual use, often under extreme environmental conditions, does not permit frequent renewal of lubricant. One of the most satisfactory lubricants under such conditions are organo-silicone compounds with high thermal stability, low viscosity independent of temperature, and good adhesion to metal surfaces. Unfortunately, these characteristics also tend to cause lubricant to spread or travel over a metal surface, thus slowly permitting the lubricant to migrate from the working areas. Although various attempts have been made to seal the area of such working surfaces and prevent lubricant migration, only quite recently has it been found that the very low energy fluorinated polymers can be coated onto a metal to create a surface barrier which cannot be wetted by the lubricants, even at elevated temperatures. This barrier coating effectively confines the lubricant to the working surfaces. However, the fluorinated polymers which are most desirable for this barrier coating do not themselves have good adhesion to metal. The very low surface energy associated with compounds having a perfluoralkyl "tail" results in a relatively poor adhesion to polar materials, such as metal, and in many cases to non-polar materials also, even other highly fluorinated materials. For example, the fluoroalkyl methacrylates do not adhere well to polytetrafluoroethylene. A fluorinated material which is capable of adhering well to metal and to various highly fluorinated materials useful in forming lubricant barriers has therefore been needed.

Certain fluorinated chemicals have been sold for application to fabrics, leather and the like in the form of a spray, and products of this kind, designed to impart oil and water repellency to these surfaces, have been made available. Because these fluorinated materials are soluble in conventional dry cleaning solvents, such as tetrachloroethylene or trichloroethylene, such solutions constitute the basis for the commercial products. While they do impart oil and water repellency to fabrics and leather products, these desirable properties are lost after the treated surface is dry cleaned, due to the solubility of the fluorinated materials in the dry cleaning solvents. It has therefore been desirable to provide a fluorinated material which imparts oil and water repellency and which, though soluble in the halogenated hydrocarbons such as tetrachloroethylene, becomes less soluble in halogenated hydrocarbons after the solution is sprayed onto the surface to be treated and the solvent evaporated.

It is an object of this invention to provide a new class of fluorinated compounds which is useful as a lubricant barrier for bearings and is useful as a primer coating for application of other fluorochemicals to metal surfaces because it has good adhesion to metals.

Another object of this invention is to provide fluorinated compounds which will impart good hand or feel to fabrics, leathers and the like, which will render such materials repellent to oil and water and which will resist removal therefrom by dry cleaning solvents.

The new class of fluorinated compounds provided in accordance with this invention comprises a polyvalent metal compound having at least one polyvalent metal atom bonded to a phosphate ester group containing one or more perfluoroaliphatic (including perfluorocycloaliphatic) groups having 4 to 20 carbon atoms, each polyvalent metal atom therein being chelated with an enolizable beta-dicarbonyl compound, said polyvalent metal compound having a polyvalent metal atom/phosphorus atom ratio (M/P) from 1/2 to 20/1 and having a weight percent fluorine derived from said perfluoroaliphatic groups of from 4% to 70%, preferably from 10% to 40%. When the weight percent of fluorine falls below about 4% the product coatings show minimal or negligible resistance to wetting by oil, although substantial water repellency may still exist. The effectiveness of coatings containing more than about 40% by weight of fluorine is not appreciably better than those containing 10% to 40%, although a fluorine content of up to about 70% by weight have useful characteristics.

These novel compounds may be prepared by the condensation of an enolizable beta-dicarbonyl chelate of a polyvalent metal, such as aluminum, with a phosphate ester having at least one perfluoroaliphatic group. The phosphate ester (i.e. the condensation reaction product of an alcohol and phosphoric acid) may have either one or two ester groups, the remaining phosphorus bonding being directly to —OH or —Cl. When the phosphate ester is monobasic or dibasic, i.e. one or two hydroxyl groups directly bonded to the phosphorus, it may be reacted with any polyvalent metal chelate having at least one substituent bonded to the polyvalent metal which is condensable with the hydroxyl group or groups of the phosphate ester to form an M—O—P bonding, including such substituents as alkoxy, chlorine, and acyl on the polyvalent metal, these substituents condensing with the phosphate ester to liberate alcohol, hydrochloric acid, and a carboxylic acid, respectively. When the phosphate ester has one or two chlorine atoms directly bonded to the phosphorus atom, i.e. a monochlorophosphate ester or a dichlorophosphate ester, it may be reacted with a polyvalent metal chelate having bonded to the polyvalent metal at least one substituent which is condensable with the chlorine atom or atoms of the chlorophosphate ester to form an M—O—P bonding, including such substituents as —O— (alkali metal), salt being liberated in the condensation reaction. Depending on the functionality of the polyvalent metal chelate and the phosphate ester ("functionality" here referring to the number of condensable groups) and on the relative concentration of the polyvalent metal chelate and phosphate ester, the resulting condensation products may vary greatly in molecular weight and in the ratio of polyvalent metal to phosphorus. However, the polyvalent metal/phosphorus (M/P) ratio preferably ranges from 1/2 to 20/1. If the phosphate ester is monofunctional, i.e. has only one group which is capable of condensing with the polyvalent metal chelate, the resulting product may have an M/P ratio of 1/1 if the polyvalent metal chelate is also monofunctional or 1/2 if the polyvalent metal chelate is difunctional. If the polyvalent metal chelate molecules are of the type which can condense with each other by virtue of two condensable substituents on the polyvalent metal, such as alkoxy and hydroxy which condense to split off alcohol, a condensation product with recurring M—O—M bonds is formed, and the introduction of a phosphate ester which is monofunctional, i.e. has only one group capable of condensing with a substituent of the polyvalent metal chelate, serves as a chain terminator, providing a final product with an M/P ratio of from 1/2 to 20/1, depending on the relative concentration of the reactants. When the phosphate ester is also difunctional and can condense with two moles of the polyvalent metal chelate to form M—O—P—O—M bonds, the M/P ratio may be usefully varied over the entire range of 1/2 to 20/1. In all such preparative procedures, the resulting condensation product may be a single compound or a mixture of compounds, depending on the ratio of reactants and their functionality. For some of the condensation products of this invention, the reaction mechanism and conditions are similar to those described in British Patent No. 826,065, although the resulting products themselves are quite different.

It is also possible to carry out the condensation reaction between the fluorinated phosphate ester and a non-chelated polyvalent metal compound, then to react the condensation product with the enolizable beta-dicarbonyl compound to form the polyvalent metal chelate. A still further variation is to replace the phosphate ester with a pentavalent phosphorus compound in which one or two perfluoroaliphatic radicals are bonded directly to the phosphorus atom through a carbon-phosphorus bond, the remaining phosphorus substituents being —OH or —Cl.

The phosphate esters may be derived from phosphoric acid or $POCl_3$ and fluoroaliphatic alcohols, particularly alcohols having at least one perfluoroaliphatic (including perfluorocycloaliphatic) group. To obtain the desired oil repellency and receptivity to fluoroaliphatic polymers these perfluoroaliphatic groups should have a minimum of four fluorine-containing carbon atoms, at least one of which is a $CF_3$ group. Preferably the perfluoroaliphatic groups do not contain more than 20 carbon atoms, since larger radicals tend to decrease the solubility of the condensation product of this invention and do not have any particular advantages. Illustrative fluoroaliphatic alcohols are set forth in Table I. U.S. 3,094,370 and U.S. 3,217,035 illustrate fluorinated polyhydric alcohols. Fluoroaliphatic phosphates are described in U.S. 2,559,749; 2,597,702; 2,727,058; 3,083,224; 3,096,207; 3,112,241; and 3,293,306. Most of the preferred fluoroaliphatic phosphate esters are prepared from alcohols of the formula $R_fQOH$, where $R_f$ is a perfluoroaliphatic group and Q is a divalent linking group comprising an alkylene radical which may also contain other linkages such as oxy (—O—), thio (—S—), carbonyl (—CO—), carboxyloxy (—$CO_2$—), sulfoxy (—SO—), sulfonyl (—$SO_2$—), phenylene (—$C_6H_4$—), carbonamido (—CON<) and sulfonamido (—$SO_2$N<).

The chelatable polyvalent metal is a metal capable of forming two, three or four covalent bonds, particularly zirconium,

TABLE I $CF_3(CF_2)_7SO_2N(CH_3)CH_2CH_2OH$
$CF_3(CF_2)_3SO_2N(CH_3)CH(CH_3)CH_2OH$
$CF_3(CF_2)_3SO_2N(CH_2CH_3)CH_2CH_2OH$
$CF_3(CF_2)_3SO_2N(CH_3)CH_2CH(CH_3)OH$
$CF_3(CF_2)_7SO_2N(CH_2CH_3)CH_2CH_2OH$
$CF_3(CF_2)_9SO_2N(CH_2CH_2CH_3)CH_2CH_2OH$
$CF_3(CF_2)_7SO_2N(CH_2CH_2CH_3)CH_2CH_2OH$
$CF_3(CF_2)_7SO_2N(C_2H_5)(CH_2)_6OH$
$CF_3(CF_2)_7SO_2N(C_2H_5)(CH_2)_{11}OH$
$CF_3(CF_2)_7SO_2N(C_4H_9)(CH_2)_4OH$
$CF_3(CF_2)_7SO_2N(CH_3)(CH_2)_4OH$
$CF_3C_6F_{10}C_2F_4SO_2N(CH_3)CH_2CH_2OH$
$C_2F_5O(C_2F_4O)_3CF_2CONHC_2H_4OH$
$CF_3(CF_2)_7SO_2N(C_3H_7)CH_2OCH_2CH_2CH_2OH$ $$CF_3CF_2-\overset{F}{\underset{|}{C}}-CF_2 \diagdown_{O} \diagup NCF_2CF_2SO_2N(CH_3)CH_2CH_2OH$$
$$CF_3CF_2-\underset{|}{C}-CF_2$$
$$\phantom{CF_3CF_2-C}F$$

$CF_3CF(CF_2Cl)(CF_2CF_2)_6CF_2CON(CH_3)CH_2CH_2OH$
$CF_3(CF_2)_6SO_2CH_2CH_2OH$
$CF_3(CF_2)_6COCH_2CH_2OH$
$C_7F_{15}CON(C_2H_5)C_2H_4OH$ $$CF_3CF_2C\diagup^{CF_2CH_2OH}_{F}\diagdown_{CF_2CF_2CH_2OH}$$

$(CF_3)_2CF(CF_2)_7SO_2N(CH_3)CH_2CH_2OH$
$CF_3CF(CF_2Cl)(CF_2)_9SO_2N(CH_3)CH_2CH_2OH$
$CF_3CF(CF_2H)(CF_2)_9SO_2N(C_2H_5)(CH_2)_3CH_2OH$
$CF_3(CF_2)_5(CH_2)_4SO_2N(C_2H_5)CH_2CH_2OH$
$CF_3(CF_2)_7SO_2N(C_2H_5)CH_2CHOHCH_2OH$
$C_8F_{17}CH_2CH_2CH_2OH$
$CF_3OC_2F_4CH_2OH$
$C_5F_{11}CFHCF_2CH_2OH$
$C_7F_{15}CH_2OH$
$C_{16}F_{33}CH_2CH_2OH$ chromium, titanium or, preferably, aluminum. The polyvalent metal chelates may have alkoxy (forming an alcoholate), chlorine, acyl and —O (alkali metal) substituents. Such well known chelates are illustrated by the aluminum alcoholates of U.S. 2,932,659. Enolizable beta-dicarbonyl compounds include such compounds as acetylacetone, ethyl acetoacetate, benzoylacetone, furoylacetone, ethyl trifluoroacetoacetate, etc.

Preparation of the fluorinated polyvalent metal complexes of this invention may be carried out at room temperature, preferably an elevated temperature from 65° C. to 200° C., with or without inert solvents such as aliphatic ketones, aromatic hydrocarbons, halogenated hydrocarbons, etc. While aliphatic alcohols can be used as a solvent, they tend to react with either the metal complex or the phosphate ester and are, therefore, less desirable. If a solvent is used, it should have a boiling point higher than the alcohol corresponding to any alkoxy groups attached to the polyvalent metal, so as to permit the reaction to be run at reflux conditions and the removal of this more volatile alcohol. The amount of solvent is not particularly important, although it is preferably sufficient to promote the desired reaction and to assist in heat transfer. Normally enough solvent is used to provide a product concentrate having from 20 to 50 weight percent solids, and this concentrate may then be diluted before use (e.g. to 0.25 to 5% by weight) by adding aliphatic hydrocarbons (e.g. Stoddard solvent, $C_6$–$C_{10}$ alkanes), aromatic hydrocarbons (e.g. xylene, toluene, etc.) or chlorinated hydrocarbons (e.g. $CCl_3CH_3$). Solvents and diluents boiling below about 150° C. are preferred to simplify their removal after the product mixture is applied to a metal, leather, fabric or other surface. While these fluorinated polyvalent metal complexes are hydrolyzed by water, the rate of hydrolysis is relatively slow at room temperature, and for some applications it is feasible to emulsify the product concentrate in water immediately prior to use and to apply the emulsion to the surface to be treated. A true emulsion may be obtained with the aid of surface active agents, such as a metal or ammonium salt of a fluoroaliphatic carboxylic acid, or mechanical dispersions of lower stability may be provided by homogenization procedures.

An illustrative procedure for the preparation of fluorinated polyvalent metal complexes of this invention follows.

Into a three liter, three necked flask equipped with stirrer, condenser and thermometer was charged 330 grams (2.54 moles) of ethyl acetoacetate and 518 grams (2.54 moles) of aluminum isopropylate. The mixture was heated at 110° C. for 1½ hours, and the isopropyl alcohol produced in the reaction was then distilled off at a pressure of about 20 millimeters mercury. The reaction contents were then cooled, and 300 grams of xylene and 895 grams (1.27 moles) of a mixture of 90 mol percent of N-ethyl perfluorooctanesulfonamidoethyl diacidphosphate and 10 mol percent of bis(N-ethyl perfluorooctanesulfonamidoethyl) monoacidphosphate were added. The reaction mixture was heated to 90° C. for one hour, then the isopropyl alcohol and xylene were stripped off under a pressure of 20 millimeters mercury at a temperature of 125° C. Further heating at 125° C. under a pressure of 7 millimeters mercury provided 1362 grams of residual product. The principal chemical reactions may be represented in the following manner.

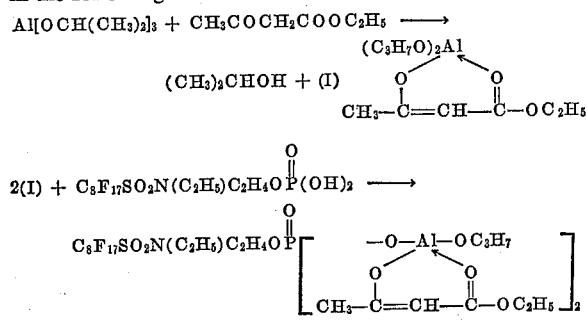

and

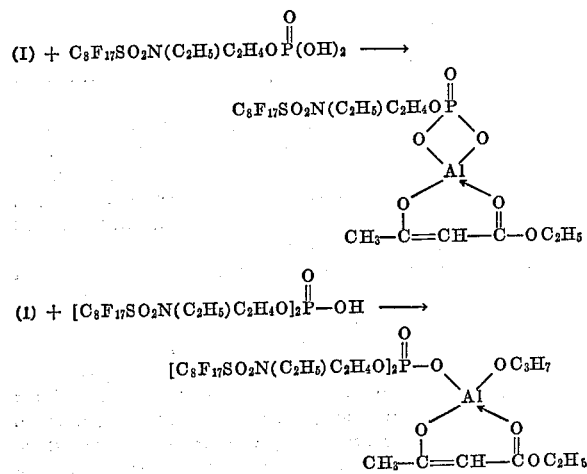

A 1% solution of this product mixture in 1,1,1-trichloroethane was sprayed onto the surface of suede leather. After the solvent had evaporated the leather sample had a spray rating of 85 (AATCC spray test 22—1952) and an oil repellency of 85, using the oil repellency test set forth in Example IV of U.S. 3,217,035. The treated leather surface had a very good hand both before and after dry cleaning, as contrasted to the harsh hand or feel imparted to leather by treatment with the fluorinated phosphate ester above. Oil repellency and spray rating values of various textiles treated with this product mixture are shown in Table II.

TABLE II

| Fabric | Oil repellency | Spray rating |
|---|---|---|
| Cotton | 75 | 70 |
| Nylon | 70 | 70 |
| Viscose | 70 | 85 |
| Wool | 80 | 80 |

The fluorinated, phosphorus-containing polyvalent metal complexes of this invention have been found to adhere well to highly polar surfaces, such as brass, aluminum, stainless steel, glass, diamond, etc. and simultaneously to provide an anchoring or primer layer to which fluorinated polymers, such as the perfluoroalkyl methacrylates, readily and securely bond. The fluoroalkyl group apparently permits wetting by the fluorine-containing solvents required for the perfluoroalkyl methacrylates and other highly fluorinated polymers without interfering with the adhesion to the polar substrate attributable to the metallic moiety in the molecule. Effective barriers to migration of silicone lubricants can be created by coating a surface with these compounds to form a primer coating which has many of the characteristics of a fluorochemical surface, e.g. oil repellency, although the surface energy is substantially higher than is obtained from the highly fluorinated polymers that procide high surface concentration of fluoroalkyl groups. For examples, at room temperature the contact angle of a drop of hexadecane on a representative polyvalent metal complex of this invention is about 50°, in contrast to a contact angle of about 0° on bare metal and 70° or higher on perfluoroalkyl methacrylate surfaces. A most effective silicon lubricant barrier may then be applied onto this primer coating, preferably after the primer has been baked for 5 to 30 minutes at 50–125° C. For example, a final coating may be prepared from a highly fluorinated polymer, which normally is coated from a fluorine-containing solvent such as xylene hexafluoride or perfluorinated cyclic ether.

The oil and water repellency imparted to garment suede with various fluorinated, phosphorus-containing polyvalent metal complexes of this invention are shown in Table III. Durability to dry cleaning was also evaluated. The compounds of the samples were dissolved in xylene hexafluoride solvent to form 1 weight percent solutions,

TABLE III

| | | | Initial | | After drycleaning | |
|---|---|---|---|---|---|---|
| Sample | Compound | Hand | Oil | Spray | Oil | Spray |
| 1 | $C_8F_{17}SO_2N(C_2H_5)CH_2CH_2O\overset{O}{\underset{\|}{P}}$ (complex with Al and $CH_3-C=CH-COC_2H_5$ ligands) | Good | 70 | 85 | 50 | 75 | and probably some polymer having recurring units of the formula

TABLE III.—Continued

| Sample | Compound | Hand | Initial Oil | Initial Spray | After drycleaning Oil | After drycleaning Spray |
|---|---|---|---|---|---|---|
| | 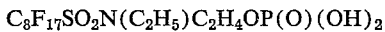 | | | | | |
| 2 | 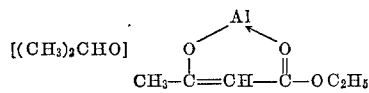 | Excellent | 70 | 90 | 50 | 80 |
| 3 | 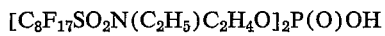 | Poor (draggy) | 0 | 75 | 0 | 0 | this solvent being selected because of the low solubility of Sample No. 1 in conventional solvents. They were then sprayed onto garment suede until the surface was wetted with about 15 ml. per 1000 cm.² The samples were then allowed to dry for five minutes at 65° C. and were tested for hand and for oil and water resistance. The samples were thereafter immersed in a beaker of $CCl_2=CCl_2$ containing 1% soap, agitated, excess solvent removed by squeezing, dried for five minutes at 65° C., and retested for oil and water resistance. From the results shown in Table III is can be seen that the water resistance of the fluorine-containing complexes (Samples 1 and 2) is significantly better than the water resistance, both before and after dry cleaning, of a non-fluorinated, phosphorus-containing polyvalent metal complex (Sample 3). It is also apparent that the fluorine-containing complexes display outstanding oil repellency, compared to essentially no oil repellency of the non-fluorinated complex. Furthermore the hand of the fluorinated complexes is considerably better than the non-fluorinated complexes.

In an additional series of experiments various other fluorinated phosphorus-containing aluminum chelates were prepared and used to treat suede leather, the data being reported in Table IV. The compound of Sample A was prepared by reacting one mol of $$C_8F_{17}SO_2N(C_2H_5)C_2H_4OP(O)(OH)_2$$

and two mols of

[(CH₃)₂CHO] \\
$$\begin{array}{c} Al \\ O \diagup \diagdown O \\ CH_3-C=CH-C-OC_2H_5 \end{array}$$

at reflux in toluene, distilling the solvent and raising the flask temperature to 170° C. This residual product was dissolved as a 1 weight percent solution in toluene and sprayed onto suede leather. The compound of Sample B was prepared by carrying out the same reaction in xylene at 125° C. In Sample C the same reactants were used at a ratio of one mol phosphate ester to 10 mols aluminum chelate in xylene solvent at 128° C. The compound of Sample D was prepared by reacting one mol of $$[C_8F_{17}SO_2N(C_2H_5)C_2H_4O]_2P(O)OH$$

and two mols of the aluminum chelate of Sample A at 85° C. in a solvent mixture having equal amounts of isopropyl alcohol and isopropyl ether. In Sample E the compound was the unreacted aluminum chelate of Sample A.

TABLE IV

| Sample | 1 wt. percent solution in— | Suede leather Oil | Suede leather Spray |
|---|---|---|---|
| A | Toluene | 60 | 80 |
| B | Xylene | 70 | 80 |
| C | CH₃CCl₃ | 55 | 75 |
| D | Isopropyl alcohol-isopropyl ether | 75 | 90 |
| E | CH₃CCl₃ | 0 | 70 |

Sample C with a M/P ratio of 10/1 shows somewhat lower oil repellency than Sample B with a M/P ratio of 2/1. At M/P ratios greater than about 20/1 the oil repellancy rating tends to be below the acceptable lower limit of oil repellency, and the 20/1 materials do not bond as readily to fluoroalkyl polymers.

Various other embodiments of the present invention will be apparent to those skilled in the art without departing from the scope thereof.

The embodiments of the invention in which an exclusive property or privilege is claimed are defined as follows:

1. A polyvalent metal chelate compound having at least one zirconium, chromium, titanium or aluminum atom bonded to a phosphate ester group in which the phosphorus is bonded to one or two ester groups and each group contains a $C_4$–$C_{20}$ perfluoroaliphatic radical having at least one —$CF_3$ group, each polyvalent metal atom therein being chelated with an enolizable beta-dicarbonyl compound, said polyvalent metal chelate compound having a polyvalent metal atom/phosphorus atom ratio from 1/2 to 20/1 and having a weight percent fluorine derived from said perfluoroaliphatic groups of from 4% to 70%.

2. The polyvalent metal chelate compound of claim 1 in which said polyvalent metal compuond is aluminum.

3. The polyvalent metal chelate compound of claim 1 in which said polyvalent metal atom/phosphorus atom ratio is 1/2.

4. The polyvalent metal chelate compound of claim 1 in which said polyvalent metal atom/phosphorus atom ratio is 1/1.

5. The polyvalent metal chelate compound of claim 1 in which said polyvalent metal atom/phosphorus atom ratio is 2/1.

6. The polyvalent metal chelate compound of claim 1 in which said polyvalent metal atom/phosphorus atom ratio is 10/1.

7. The polyvalent metal chelate compound of claim 1 in which said weight percent fluorine is 10% to 40%.

References Cited

UNITED STATES PATENTS

| | | |
|---|---|---|
| 3,197,436 | 7/1965 | Block et al. |
| 3,245,953 | 4/1966 | Block et al. |
| 3,255,125 | 6/1966 | Block et al. |

FOREIGN PATENTS 1,018,456   1/1966   Great Britain.

OTHER REFERENCES

Block et al., Inorganic Chemistry, vol. 1, p. 860 (1962).
Chemical Abstracts, vol. 63, p. 699f (1965).
Chemical Abstracts, vol. 64, p. 19790c–g (1966).

TOBIAS E. LEVOW, Primary Examiner

H. M. S. SNEED, Assistant Examiner

U.S. Cl. X.R.

117—105, 121, 124, 127, 139.5, 142; 260—2, 63, 242, 346.1, 429.3, 429.5, 438.5

UNITED STATES PATENT OFFICE
CERTIFICATE OF CORRECTION

Patent No. 3,465,014      Dated September 2, 1969

Inventor(s) Frank J. Pavlik

It is certified that error appears in the above-identified patent and that said Letters Patent are hereby corrected as shown below:

Column 7, Sample 2, under heading "Compound" the formula should read

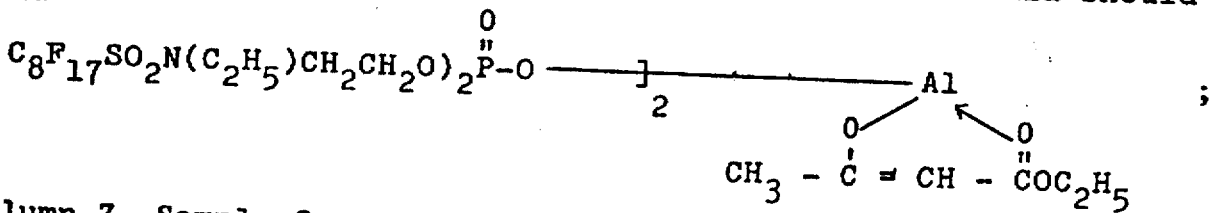

Column 7, Sample 3, under heading "Compound" the formula should read

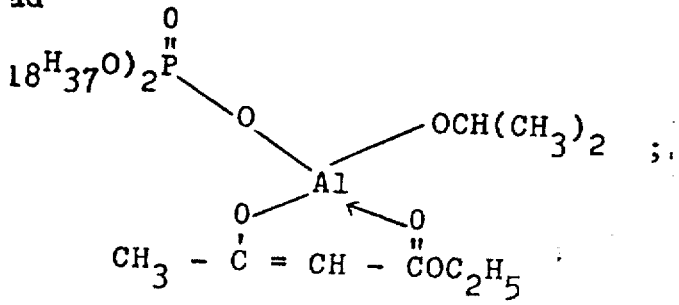

Column 7, approximately lines 57-60 the formula should read

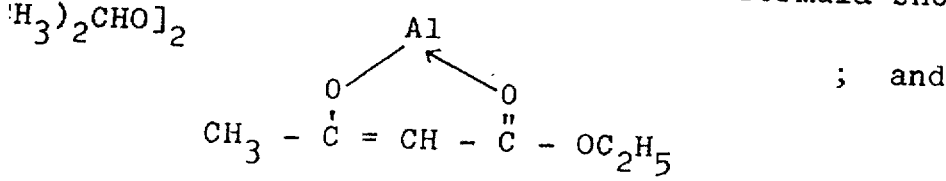
; and

Column 8, line 62 "metal compuond is" should read "metal is".

SIGNED AND SEALED
APR 28 1970

(SEAL)
Attest:

Edward M. Fletcher, Jr.
Attesting Officer

Commissioner of Patents